United States Patent [19]

Westmoreland

[11] Patent Number: 4,509,379
[45] Date of Patent: Apr. 9, 1985

[54] ROTARY TO RECIPROCATING MOTION CONVERTER

[76] Inventor: Julius C. Westmoreland, 4600 Via Dolce, #104, Marina del Rey, Calif. 90291

[21] Appl. No.: 374,082

[22] Filed: May 3, 1982

[51] Int. Cl.³ .................. F04B 21/02; F04B 39/08
[52] U.S. Cl. .................. 74/58; 74/89.15; 74/424.8 R; 92/33; 192/26; 192/48.91
[58] Field of Search .......... 74/89.15, 58, 59, 127, 74/424.8 R; 92/33, 31; 417/223, 319; 192/26, 48.91

[56] References Cited

U.S. PATENT DOCUMENTS

| | | | |
|---|---|---|---|
| 631,217 | 8/1899 | Kruming | 74/59 X |
| 1,216,865 | 2/1917 | Smith | 74/59 X |
| 1,409,090 | 3/1922 | Glasser | 74/59 X |
| 1,421,163 | 6/1922 | Burrows | 74/58 |
| 2,424,153 | 7/1947 | Curtis et al. | 74/59 X |
| 2,808,033 | 10/1957 | Geier et al. | 74/127 |
| 2,932,206 | 4/1960 | Tootle | 92/33 X |
| 2,970,574 | 2/1961 | Geyer | 92/33 X |
| 3,187,592 | 6/1965 | Geyer | 92/33 X |
| 3,255,806 | 6/1966 | Meyer et al. | 92/33 X |
| 3,704,632 | 12/1972 | Orosz | 74/127 |
| 3,751,998 | 8/1973 | Vasilatos | 74/89.15 |
| 4,321,992 | 3/1982 | Gallo | 192/84 T X |

FOREIGN PATENT DOCUMENTS

| | | | |
|---|---|---|---|
| 0314430 | 1/1934 | Italy | 74/127 |
| 0462636 | 3/1951 | Italy | 74/127 |

OTHER PUBLICATIONS

IBM Technical Disclosure Bulletin, vol. 21, No. 2, Jul. 1978, G. B. Overton, Modular Increment Clutch.
IBM Technical Disclosure Bulletin, vol. 20, No. 5, Oct. 1977, L. A. Burton et al., Keyboard Clutch.

Primary Examiner—Rodney H. Bonck
Assistant Examiner—David D. House

[57] ABSTRACT

The described motion converter has a housing in which a drive shaft is interconnected with a rotary motion power source. The drive shaft has an extent having a left-hand thread adjacent one end thereof and an extent having a right-hand thread located adjacent the opposite end thereof. Threaded nuts on the left and right hand threaded portions each have spiral spring clutches. An actuator is slidingly received upon the intermediate portion of the drive shaft with pins located at opposite ends of the actuator to engage one spring clutch while releasing the other. A spring loaded positioning device associated with the actuator insures that the actuator is positively located to engage one or the other of the clutches and prevents the actuator from hanging up at an intermediate position.

9 Claims, 8 Drawing Figures

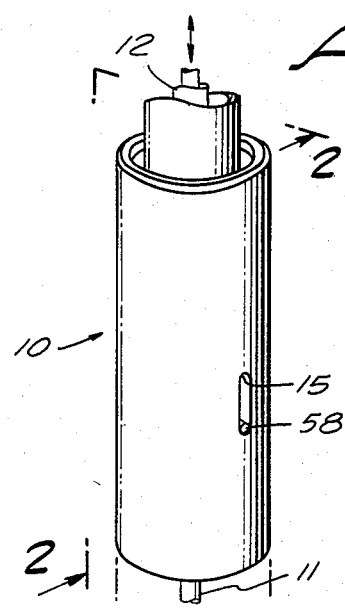
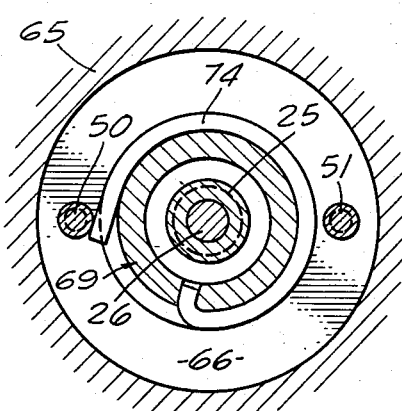
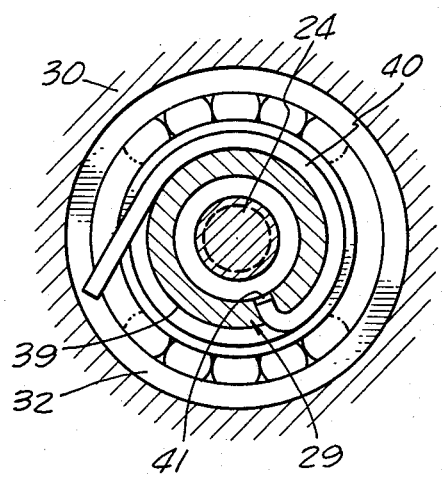
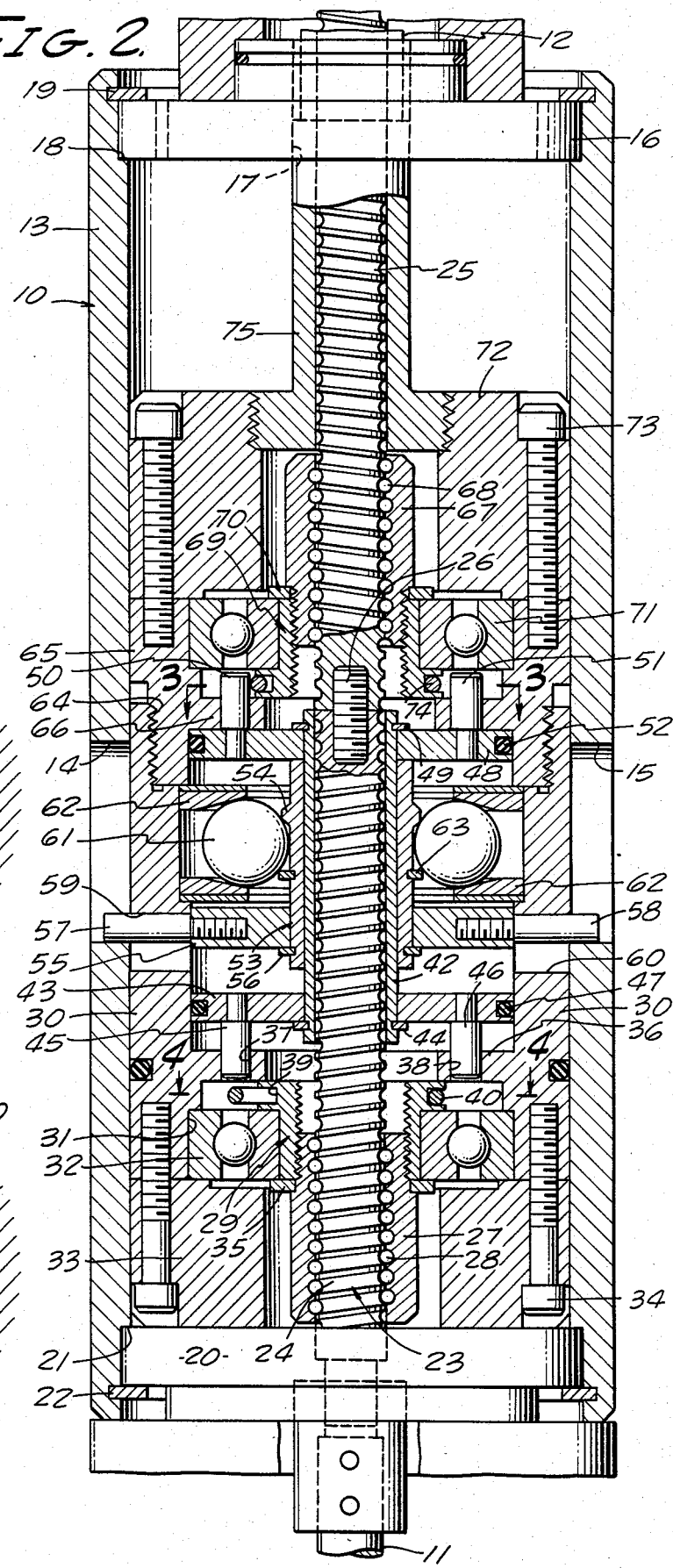
FIG. 1.
FIG. 2.
FIG. 3.
FIG. 4.

ROTARY TO RECIPROCATING MOTION CONVERTER

The present invention relates generally to a rotary to reciprocating motion converter and, more particularly, to such a converter especially adapted for in-line use.

BACKGROUND OF THE INVENTION

In the field of fluid pumps, there is a frequent need for means for converting conventionally available rotary power (e.g. an electric motor) to a reciprocating motion to drive the pump. Such reciprocating mechanical power sources are especially advantageous where space constraints make in-line operation desirable or necessary.

SUMMARY

In accordance with the motion converter described herein, there is provided a housing in which a drive shaft is interconnected with a rotary motion power source, such as an electric motor for example. The drive shaft includes an extent having a left-hand thread adjacent one end thereof and an extent having a right-hand thread located adjacent the opposite end thereof. Separate nut means are threaded on the respective left and right hand threaded portions, each of which nut means includes individual spiral spring clutches. A selectively operated actuator is slidingly received upon the intermediate portion of the drive shaft between the left and right-hand threaded portions. Pins located at opposite ends of the actuator cyclically engage the spring clutch of one of the nut means while simultaneously releasing the other nut means. A spring loaded positioning device associated with the actuator insures that the actuator is positively located to engage one or the other of the nut means clutches and prevents the actuator from hanging up at an intermediate position.

In operation, assuming the spring clutch is engaged such that the spring nut on the right hand thread is actively engaged, rotation of the drive shaft by the rotary power source causes the nut to move along the drive shaft which, in turn, moves means connected to the nut driving the positive locating device to disengage the one clutch and engage the other clutch. Now, the nut located on the left-hand threaded part of the drive shaft is actively engaged whereas the nut means on the right-hand drive is in free running condition. In this manner, a shaft extending from the housing connected therewith reciprocates along a path parallel to the drive shaft.

DESCRIPTION OF THE DRAWING

FIG. 1 is a perspective view of the rotary to reciprocal movement converter of the present invention.

FIG. 2 is an elevational sectional view of the converter taken along the line 2—2 of FIG. 1 shown at one limit.

FIG. 3 is a top plan sectional view taken along the line 3—3 of FIG. 2.

FIG. 4 is a further top plan sectional view taken along the line 4—4 of FIG. 2.

DESCRIPTION OF THE PREFERRED EMBODIMENT

Figure 5:
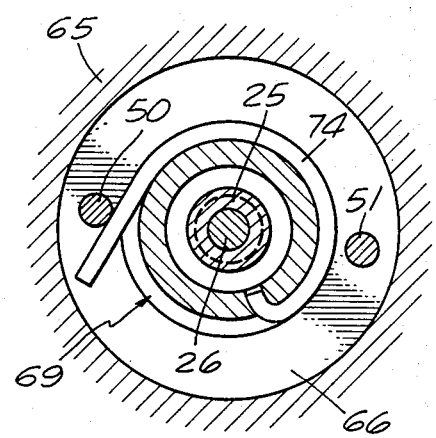
FIGS. 5 and 6 are views similar to FIGS. 3 and 4 showing the spring clutch in further modes of operation.
Figure 6:
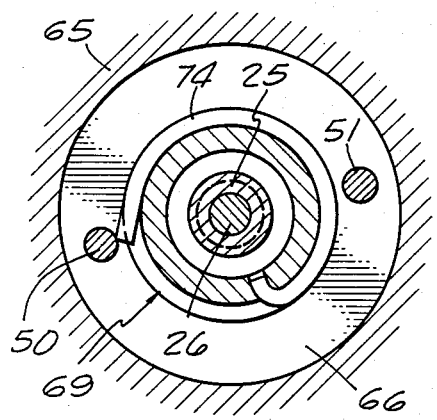

Turning now to the drawing and particularly FIG. 1, the mechanical motion converter of the present invention enumerated generally as at 10 is seen to be of overall elongated cylindrical configuration with an input shaft 11 for interconnection with a suitable rotary power source (not shown) and an output shaft 12 for providing the desired reciprocating movement. The two shafts 11 and 12 lie along the longitudinal cylindrical axis of the converter thereby enhancing the use of the device for in-line operation.

With reference now particularly to FIG. 2, the converter 10 is seen to have a cylindrical, open-ended housing 13 including a pair of longitudinally extending slots 14 and 15 centrally located along the housing and at opposite sides thereof. An end plate 16 having a centrally located opening 17 therein is fitted within the upper open end of the housing 13 and positively positioned against an inner shoulder 18 by a snap ring 19. The opposite or lower open end of the housing 13 is similarly closed by a plate 20 that abuts against an inner housing wall shoulder 21 and secured thereto by a snap ring 22. A centrally located opening in plate 20 is provided to accommodate the rotary power input shaft 11.

A threaded drive shaft 23 extends substantially completely through the housing along the longitudinal axis thereof and is connected at one end (lower as shown in FIG. 2) to the rotary power source input shaft 11 in a conventional manner. More particularly, the shaft 23 consists of a first part or half 24 having a right-hand thread on its periphery and a second part or half 25 having a left-hand thread. The two shaft parts are joined in end-to-end aligned and unitary relationship by a threaded means 26.

An elongated cylindrical nut 27 received on the drive shaft 23 has an internal thread of such dimensions as to enable meshing with the right-hand threaded portion 24 via a set of ball bearings 28. The bearings 28 are retained within the nut throughout movement of the nut along the drive shaft thread or on rotation about the drive shaft. The outer end margin of the nut 27 is threaded for receipt within a similarly threaded annular clutch body 29.

A piston-like drive cylinder 30 has an outer diameter such as to permit a sliding fit within the internal bore of the housing 13. The outwardly facing end of the drive cylinder includes an enlarged cavity 31 within which the clutch body 29 is centrally located by a thrust bearing 32. The outer ring of the thrust bearing 32 is secured against a shoulder within the drive cylinder 30 by an annular cover plate 33. Bolts 34 secure the cover plate over the outer end of the drive cylinder. The inner ring of the thrust bearing 32 is secured firmly to the clutch body 29 by the combined action of a retainer ring 35 and a projecting shoulder of the nut 27. As described to this point, the nut 27 and clutch body 29 are unitarily related and rotatable about the shaft 23 and, therefore, with respect to the drive cylinder 30. In a way that will be described, a clutching action is provided that will secure both the clutch body 29 and the nut 27 to the drive cylinder 30, such that rotation of the shaft 23 will then cause the nut 27 and drive cylinder 30 to move as a unit along the thread of the drive shaft.

The inner end surface of the clutching plate 29 slidingly contacts an annular flange 36 which extends inwardly and is integral with the drive cylinder 30. This flange also includes first and second openings 37 and 38 for a purpose to be described.

Figure 7:
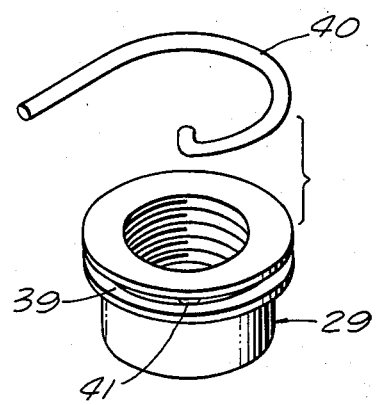
FIG. 7 is an exploded view of the spring clutch for use in the present invention.

The clutch body 29 includes a circumferentially extending groove 39 on its periphery within which a loop 40 of spring wire is received, one end of which is anchored within an opening 41 as can be seen best in FIGS. 4 and 7 and the other end extends outwardly of the body. In a way that will be more particularly described, when the outer end of the sprial spring wire is unencumbered, the nut 27 and inner portion of the thrust bearing 32 rotate freely with the drive shaft. However, securing engagement of the outer end of the spiral spring, rotation of the clutch body 29 and nut 27 is prevented and the continuous rotation of the drive shaft causes the nut, clutch plate and drive cylinder 30 to move along the shaft.

Just beyond the flange 36 and in the central region of FIG. 2, there is shown apparatus for selectively actuating the spiral spring 40 in the manner of a clutch, the construction and operation of which will be given at this time. An elongated metal cylindrical sleeve 42 slidingly received onto the drive shaft has a first drive plate 43 received onto one end and secured in place by a retainer ring 44. First and second clutch pins 45 and 46 affixed to the drive plate extend away from the drive plate toward the flange 36 and are aligned with the respective openings 37 and 38. An O-ring 47 provides a sealing relation for the drive plate with the internal wall surface of cylinder 30 within which the drive plate moves.

Immediately adjacent the opposite end of the sleeve 42, there is provided a further drive plate 48 secured in place by retainer ring 49 and including first and second clutch pins 50 and 51 extending upwardly and parallel to the drive shaft. O-ring 52 provides desirable sealing for the drive plate edge with the adjacent inner wall surface.

A cylindrical slide 53 is received onto the cylinder 42 and adapted for sliding movement along the cylinder between the two drive plates 43 and 48 which serve as limit stops. A circumferential ridge 54 projects outwardly of the peripheral surface of the slide a limited extent for a purpose to be described.

An annular plate 55 is received on the lower end of the slide 53 and secured against movement therealong by a retainer ring 56. First and second actuator pins 57 and 58 are threaded into the edge of the annular plate 55 and extend outwardly therefrom with their ends being located within the housing slots 14 and 15, respectively, thereby preventing rotation of the plate 55. It is also noted that these pins extend through first and second slots 59 and 60 in the wall of the drive cylinder 30.

A set of relatively large metal balls or bearings 61 are positioned just above the annular plate 55 (FIG. 2) and includes spring elements 62 which continuously and resiliently urge the bearings toward and into contact with the cylindrical slide 53. With the relative position of the parts as shown in FIG. 2, it is to be noted that the balls 61 are positively located between the slide projection 54 and a retaining ring 63. The action of the bearing 61 and spring 62 insures positive "snap-action" positioning of the slide 53 along the sleeve 42. That is, as the slide moves away from the FIG. 2 depiction and the ball begins to climb over the ridge 54, the spring elements 62 will insure that the ball does not hang up on top of the ridge, but rather will always be positioned at one side or the other of the ridge.

The upper end of the cylinder 30 located just above the bearing 61 and spring elements 62 has its inner end portion provided with threads as at 64 for receiving therein a generally annular head 65 which bears against the top of the upper spring elements 62 holding them, the bearings 61 and lower spring elements firmly within cylinder 30. A flange 66 extends inwardly a limited extent and includes openings therethrough for accommodating receipt of pins 50 and 51 at prescribed parts of the operating cycle.

A cylindrical nut 67 of construction substantially identical to previously described nut 27 is provided for threaded receipt onto the left-hand threaded portion 25 of the drive shaft. As before, the nut includes bearings 68 for aiding drive or rotation about the shaft. A clutch body 69 is threaded onto the nut 67 in identical manner to the way in which clutch body 29 is received onto the nut 27. A retainer ring 70 secures the inner ring of a thrust bearing 71 unitarily against the clutch body 69 while the outer ring of the thrust bearing is secured against the head 65 by portions of an annular end cap 72, the latter being secured to the head via a pair of threaded bolts 73. A hollow cylindrical shaft 75 is threaded into the cap 72 and extends about the drive shaft and outwardly of the assembly to form the output 12 of FIG. 1.

In operation, and assuming the parts of the converter to be in the initial position shown in FIG. 2, it is to be noted that the pins 45 and 46 are spaced from the sprial spring 40 such that the nut 27 and the clutch body 29 can freely revolve with the rotating drive shaft 23. However, the pins 50 and 51 extend through the openings in flange 66 and are in obstructing relation to the end of the spiral spring 74 in FIGS. 3 and 5, for example. Accordingly, the clutch body 69 and the nut 67 unitary therewith, are no longer free to turn with the drive shaft but, instead, as the drive shaft rotates continuously, the threads on the interior of the nut 67 will cause the nut to move upwardly as it is depicted in FIG. 2. This movement simultaneously moves the cap 72, head 65, as well as the drive cylinder 30 and its cap 33 upwardly. The movement continues raising the pins 57 and 58 within the respective slots 14 and 15 until they engage the uppermost edge of the slots, at which time still further movement of the internal assembly causes the pins 57 and 58 to be driven downwardly pulling the slide 53 downwardly into contact with the plate 43.

Figure 8:
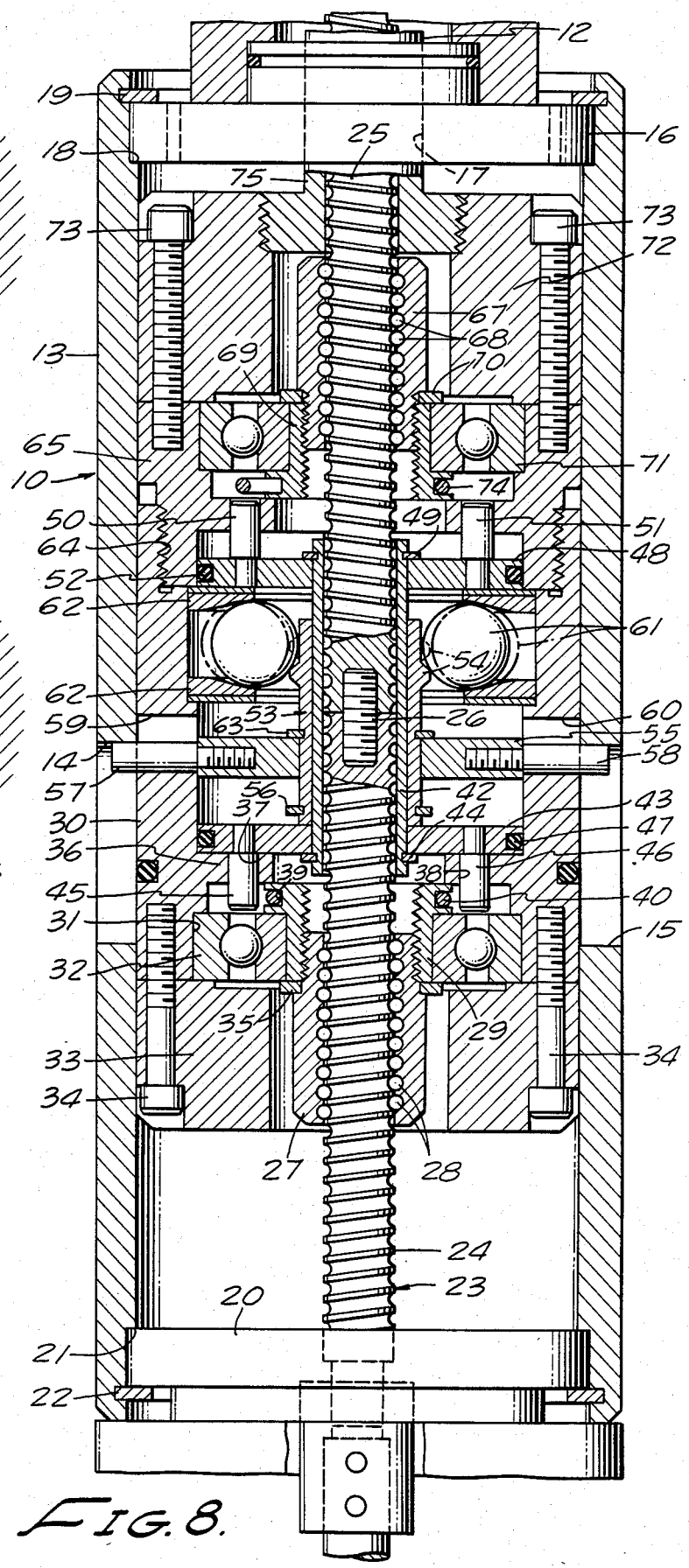
FIG. 8 is a view similar to FIG. 2 showing the apparatus at its other limit.

At this time (FIG. 8), the pins 50 and 51 are now removed from obstructing relation to the spring wire 74 and the upward drive ceases. Simultaneously with cessation of the upward drive, the pins 45 and 46 move into obstructing relation to spring wire 40 which initiates downward drive of drive cylinder 30, head 65 and caps 33 and 72 as a unit. The cycle is automatically repeated to provide the desired mechanical reciprocal output via member 12.

During each drive cycle, the ridge 54 of the cylindrical slide 53 moves past the bearing 61, at which time the spring elements cause the slide to be positively positioned. This feature is important in that it insures that when the pins 50 and 51 engage the spring clutch, the other pins 45 and 46 are disengaged, and vice versa.

I claim:

1. A converter of rotary power input to a reciprocating motion output, comprising:

a housing having a sidewall and open ends, said sidewall including at least one slot therein;

a drive shaft having one end connected to the rotary power input and including a first portion with an external right-hand thread and a second portion with a left-hand thread;

first and second nut means threaded onto the respective right-hand and left-hand shaft portions in a spaced apart relation along said shaft;

first and second clutch means respectively interconnected with said first and second nut means;

means slidably received within said housing and interconnected with said nut means for unitary movement therewith; and means slidably received on the drive shaft between said first and second nut means for cyclically engaging the first clutch means while simultaneously disengaging the second clutch means and disengaging the first clutch means while simultaneously engaging the second clutch means, said engaging and disengaging means including a pin extending into the housing slot which is driven on contact with a housing slot edge to actuate said engaging and disengaging means.

2. A converter as in claim 1, in which each said clutch means includes a clutch body mounted onto a nut means and a spring loop affixed to said body with a free end of the spring loop extending outwardly of the body.

3. A converter as in claim 2, in which the engaging and disengaging means include first and second pins which are moved into obstructing relationship with a spring loop free end to engage the said clutch means and out of obstructing relationship with a spring loop free end to disengage the said clutch.

4. A converter as in claim 3, in which the free end of the spring loop is of such length and resiliency as to permit its being driven past the first and second pins while simultaneously exerting a spring force against the pins.

5. A converter as in claim 3, in which the first and second pins are mounted onto respective first and second drive plates, said drive plates being affixed at spaced apart points along a sleeve slidingly received on the drive shaft.

6. A converter as in claim 5, in which there are two of the first pins mounted on the first drive plate at substantially 180 degrees apart and two of the second pins mounted on the second drive plate at substantially 180 degrees apart.

7. A converter as in claim 2, in which each clutch body is affixed to the inner ring of a thrust bearing race, the outer ring of which is secured to the slidable means interconnected with the nut means.

8. A converter as in claim 1, in which there are further provided spring-loaded means for positively positioning the engaging and disengaging means in its different operational modes.

9. A converter as in claim 8, in which said positive positioning means includes a plurality of ball-like bearings resiliently urged toward the engaging and disengaging means, the latter including a cylindrical member having a raised circumferential ridge which moves past the ball-like bearings on changing from engagement to disengagement and disengagement to engagement.

* * * * *